Patented Sept. 12, 1922.

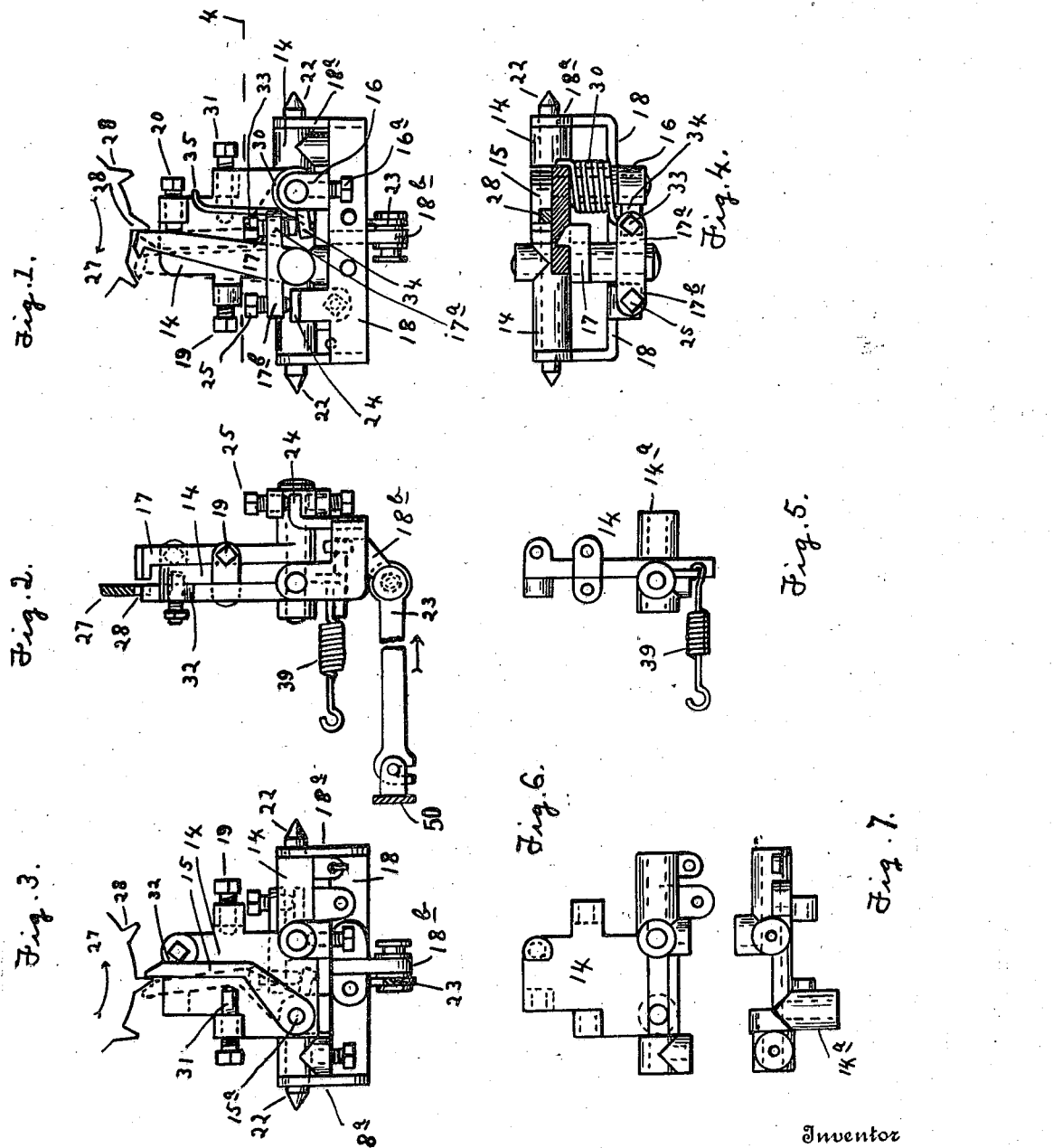

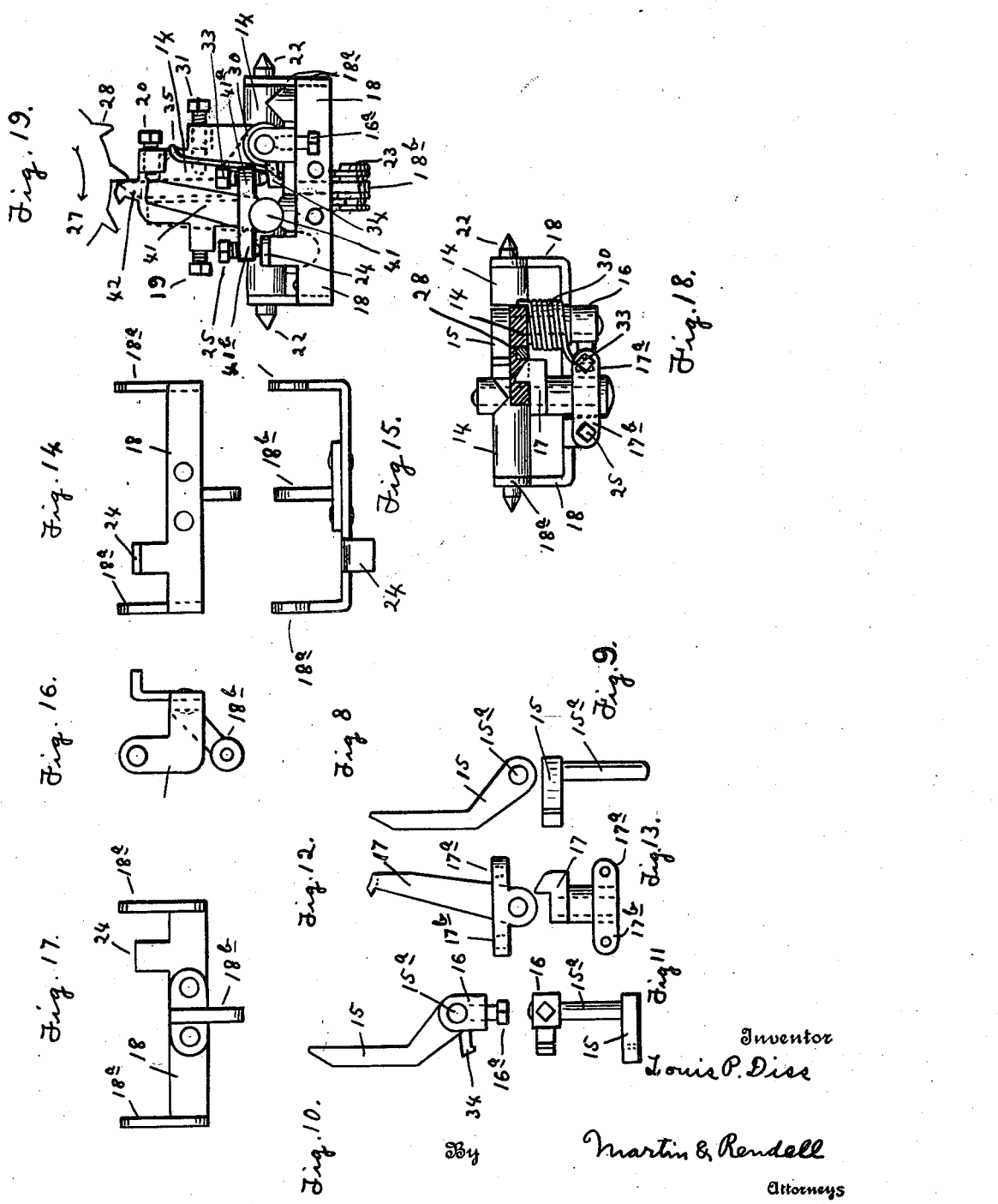

1,429,066

UNITED STATES PATENT OFFICE.

LOUIS P. DISS, OF ILION, NEW YORK.

ESCAPEMENT DEVICE FOR TYPEWRITING MACHINES.

Application filed October 1, 1920. Serial No. 414,063.

*To all whom it may concern:*

Be it known that I, Louis P. Diss, a citizen of the United States, and a resident of Ilion, in the county of Herkimer and State of New York, have invented certain new and useful Improvements in Escapement Devices for Typewriting Machines; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to letter-spacing escapements for typewriting machines.

The object of said invention is to eliminate the usual burden placed on the type-bar mechanism of operating the escapement against the force of the dog rocker and universal bar-restoring spring or springs. It is commonly understood that the said burden places a great strain on the type-bar pivots and that it is practically impossible to place the burden equally on both ends of the pivot bearings and that therefore sidewise cramping of the type-bars will be effected. This cramping will continue until the instant of the commencement of the return movement of the type from the platen, at which instant the actuation of the type-bar by the universal bar commences. It will be seen that on the instant of the change from the type-bar being the actuator to the actuated, the type-bar will be freed from the cramping strain and will vibrate to its normal condition and thereby effect the blurring of the type impressions. In view of the stated facts it will be readily seen that the elimination of the usual burden placed on the type-bar mechanism will not only effect improved type impressions but will also effect greater durability of the type-bar mechanism, a lighter touch and greater manifolding power all of which are further objects of my invention.

Figure 1 is a rear elevation of a letter-spacing escapement embodying my invention.

Fig. 2 is an end view of said device looking at the left end as the device is shown in Fig. 1, but with the escapement wheel shown in section in line with the face of the engaged tooth.

Fig. 3 is a front elevation of the device shown in Fig. 1.

Fig. 4 is a top or plan view of the parts shown in Fig. 1, but for the sake of clearness showing the dog rocker sectioned on line 4—4 of Fig. 1.

Figs. 5, 6 and 7 are respectively left end, front elevation and bottom plan views of the dog rocker 14.

Fig. 8 is a rear view of the spacing dog 15 and its shaft $15^a$.

Fig. 9 is a top view of said spacing dog and its shaft.

Fig. 10 is a rear elevation of the spacing dog 15, its shaft $15^a$ and the collar 16.

Fig. 11 is a bottom or inverted plan view of the parts shown in Fig. 10.

Figs. 12 and 13 are respectively rear elevation and top or plan views of the holding dog 17.

Figs. 14, 15, 16 and 17 are respectively rear elevation, top plan, left end elevation and front elevation views of the oscillator 18.

Fig. 18 is a view similar to Fig. 4 but showing the holding dog engaging the escapement wheel.

Fig. 19 is a view similar to Fig. 1 of a letter-spacing escapement embodying my invention in a form wherein the means for retracting the universal bar are operatively connected to the spacing dog but the holding dog is of the fixed type.

Referring first to the embodiment of my invention illustrated in Figs. 1 to 18 inclusive, the escapement wheel 27 having the usual teeth 28 is mounted as is usual to revolve in a vertical plane parallel to the line of the movement of the carriage and operatively connected therewith and with the main spring in the well-known manner not shown in the drawings. The tension of the main spring or carriage spring is to revolve the escapement wheel in the direction indicated in Figs. 1 and 3 by arrows.

The dog rocker 14 is mounted by its longitudinally projecting pivots 22 in bearings extending down from the top plate of the typewriter machine in the usual manner and for the sake of clearness not shown in the drawings. The axis of the dog rocker is at right angles to the axis of the escapement wheel. The dog rocker is of irregular shape as will be evident from an inspection of Figs. 5 to 7 inclusive. Upon the dog rocker are pivotally mounted the spacing dog 15 and the holding dog 17 each with its pivotal axis at right angles with the axis of the dog rocker.

Swingingly mounted upon the pivots 22 of the dog rocker there is provided and mounted the oscillator 18 the shape of which is clearly shown in Figs. 14 to 17 inclusive. At the opposite ends the oscillator is provided with upwardly extending arms 18$^a$ having apertures which fit the pivots 22 and allow the oscillator to have a swinging motion independent of the dog rocker or of course to swing with the dog rocker.

The spacing dog 15 by means of the spacing dog shaft 15$^a$ rigidly secured to said spacing dog is pivotally mounted upon the dog rocker 14 with the spacing dog 15 at the front of the body of the dog rocker or upon the farther side as seen in Fig. 1 or the near side as seen in Fig. 3. The spacing dog shaft 15$^a$ projects through a suitable bearing in the dog rocker 14 and has its rear end provided with a collar 16 to prevent endwise displacement of said shaft. The collar is held in desired position upon the shaft 15$^a$ by set-screw 16$^a$. From the collar 16 projects to the left as the parts are seen in Fig. 1 the arm 34 beneath which engages one end of a spring 30 coiled about the sleeve 14$^a$ on dog rocker 14 with its opposite end 35 engaging the right hand edge of the dog rocker as seen from the rear whereby said spring tends to move said spacing dog to the right as shown in Fig. 1 or to the left as more clearly shown in Fig. 3. As seen in Fig. 3 a stop-screw 31 mounted in the dog rocker 14 limits the motion of said spacing dog to the left. A shoulder 32 upon said dog rocker limits the movement of the spacing dog to the right as seen in this Fig. 3 at the position which is the state of rest position of this dog when it is retracted against the force of spring 30 by the engagement of one of the teeth 28 of the escapement wheel. In Fig. 3 there is shown in dotted lines the position of the spacing dog when free from the escapement wheel and actuated by the spring 30.

Upon the rear side or the near side of the dog rocker 14 as seen in Fig. 1 there is pivotally mounted the holding dog 17. Towards its lower end said dog is provided with oppositely extending arms 17$^a$ and 17$^b$ with the adjusting screw 25 set into arm 17$^b$ with the end of said screw projecting through said arm. Similarly the adjusting screw 33 is set into the right-hand arm as the parts are seen in Figs. 1, 12 and 13 with the end of said adjusting screw extending beneath said arm and engaging the upper surface of the arm 34 projecting from collar 16 which is secured to the shaft 15$^a$ of the spacing dog. It will now be seen that the tension of said spring 30 not only tends to move said spacing dog 15 to the right as the parts are seen in Fig. 1, but also through proper adjustment of set-screw 33 tends to move the holding dog to the left. An adjusting screw 19 set in the dog rocker 14 to the left of the holding dog 17 as seen in Fig. 1 arrests the movement of said dog to the left while the adjusting screw 20 to the right of said holding dog arrests the movement of said dog to the right at a point in line with the state of rest position of the spacing dog 15.

Upon the oscillator 18 there is provided a rearwardly extending shoulder 24 against which bears the lower end of said screw 25 in the arm 17$^b$ of the holding dog 17. To a downwardly projecting rigid arm 18$^a$ upon the oscillator is pivotally connected the rod 23 which in turn is connected to the universal bar 50 and type bars (not shown) in such manner that operation of the type bars imparts motion to the right in rod 23 as seen in Fig. 2.

The first result of this movement of connecting rod 23 to the rear will be to swing the oscillator 18 on the pivots 22 to the rear independently of the dog rocker. This motion of the oscillator 18 will raise the shoulder 24 which is to the rear of and about on a level with the pivots 22. Since the adjusting screw 25 on the left-hand arm 17$^b$ is in contact with said shoulder 24, said adjusting screw 25 and its arm will be raised carrying the holding dog 17 to the right as the parts are seen in Fig. 1 until such movement is arrested through said dog engaging the set screw 20. The position of the parts is now that illustrated in Fig 4 with the spacing dog holding the escapement tooth 28 and the holding dog advanced in line with the engaged edge of the escapement tooth, but still spaced therefrom through the dog rocker not having been moved bodily upon its axis. Further motion of the rod 23 it will be obvious can move the oscillator no further on its axis, and the holding dog no further on its axis, but will operate to move the dog rocker 14 through its pivots 22 moving in their bearings. In such movement the lower part of the dog rocker will swing to the rear and the part of the dog rocker above its axis will swing to the front. And in this last movement the oscillator 18 and the holding dog 17 and the spacing dog 15 will move with the dog rocker, but without moving relative to the dog rocker. The result of this movement will be to swing the spacing dog 15 out of engagement with the tooth 28 of the escapement wheel and to bring the holding dog into engagement with the said tooth. This position of the parts is shown in Fig. 18 which for the purpose of illustration shows the parts before the spacing dog has moved from its position in line with the holding dog. In this Fig. 18 for the sake of clearness the dog rocker 14 is also sectioned on line 4—4 of Fig. 1, although other parts of the device extend above that line.

As soon as the spacing dog 15 is disengaged from the tooth 28 of the escapement wheel 27 said spacing dog tends to make its step towards the next succeeding tooth or towards the right as the parts are seen in Fig. 1 or towards the left as the parts are seen in Fig. 3. This stepping motion is produced through the tension of spring 30 which is placed under reactive tension by the last part of the advancing movement of the carriage at the last preceding letter-space movement and as will be further explained herein. The spacing dog is limited to a short step as indicated in Fig. 3, the object being to employ an unusually strong spring 30.

Instantaneously with the type having reached the platen the holding dog will have been brought into engagement with the tooth of the escapement wheel as above described and as shown in Fig. 18 and at that instant the spacing dog 15 starts its motion under the tension of spring 30. At the same time the tension of the spring 30 begins the initial retraction of the holding dog 17. The reason for this is that as soon as the spacing dog is clear of the escapement tooth the spacing dog spring 30 exerts its tension upwardly through arm 34 which moves with the spacing dog and thereby moves the right-hand arm 17$^a$ of the holding dog upward as the parts are seen in Fig. 1 which obviously retracts the holding dog from the tooth of the escapement wheel and leaves the escapement wheel at once free to revolve, thereby allowing the carriage to at once start its movement. The spring 30 effects a single movement of the holding dog which is from the tooth of the escapement wheel and in a plane parallel to the plane of the escapement wheel. The extent of said movement is determined by the stop screw 19, the adjustment of which determines the time of commencement of the rocking movement of the dog rocker and the dogs to their normal or state of rest positions, the time of said commencement depends on the abruptness with which it may be desired to effect said rocking movement.

I have shown in Fig. 2 a dog rocker spring 39 attached to a downwardly extending lug upon the dog rocker, tending to draw the dog rocker back to normal or state of rest position. This dog rocker spring will be necessary if the holding dog has the usual flat face. The dog rocker spring is not necessary and may be entirely omitted where the holding dog has the bevel face 17$^c$ as shown in Figs. 4 and 18 of the drawings for restoring the spacing dog to its position to arrest the carriage through the advancing teeth of the escapement wheel coming into camming engagement with said bevel face of the holding dog and thereby restoring the dog rocker to normal position. The construction and operation of said beveled holding dog is further set forth and claimed in my pending application Serial No. 373,006.

Meanwhile the return of the dog rocker toward its normal position has brought the spacing dog 15 into the path of the next succeeding tooth 28 of the escapement wheel. The last part of the movement of said tooth and correspondingly of the carriage under the power of the main or carriage spring has moved said spacing dog back or to the left as the parts are seen in Fig. 1 and again placed the spring 30 under reactive tension. The spring 30 is much stronger than the usual spring used simply to move an ordinary spacing dog and in fact approaches or approximates in strength the strength of the carriage spring with the result that said spring 30 forms as it were a cushion to gradually bring the carriage to a stop at the end of its movement and this gradual stop reduces the noise and jar otherwise incident to the sudden stopping of the carriage. The strength of said spring 30 may in fact be about equal to the force of the carriage-actuating spring as the inertia of the carriage will complete its letter-space movement against the equal strength of the spring 30.

As the spacing dog 15 is thus pressed back into its normal or holding position as clearly indicated in Fig. 3 the spring 30 has been placed under reactive tension and remains so until the spacing dog is again disengaged from the escapement tooth. It will be understood, however, that the holding dog 17 will remain in its state of rest position shown in dotted lines in Fig. 1 and it will be understood that the set screw 33 on arm 17$^a$ of the holding dog has remained in upward position and that accordingly the holding dog 17 is free to move forward in line with the tooth of the escapement wheel at the beginning of the next operation without having to over-come any resistance from spring 30. It is only after the holding dog has advanced to the position shown in full lines in Fig. 1 that the holding dog is in immediate connection with the arm 34 and so in position to be at once forcibly retracted by spring 30 as soon as the spacing dog is disengaged from the escapement tooth.

Referring to the embodiment of my invention illustrated in Fig. 19 it will be seen that there is used a fixed holding dog 42, that is a holding dog fixed to the dog rocker whether as a separate piece secured to the dog rocker or as integral with the dog rocker. Movably mounted on the dog rocker is a member 41 similar to the lower end of the stepping holding dog 17 heretofore described and just above its axis provided with oppositely extending arms 41ª and 41ᵇ also similar in connection and form to the previously described arms 17ª and 17ᵇ respectively on said stepping holding dog 17. The upstanding portion of said member 41 is provided for affording convenient means for said member 41 to be stopped by stop-screw 20 as heretofore described and so end the independent motion of the oscillator 18 and then cause the dog rocker 14 to move on its axis all as hereinbefore described.

It will now be seen that the connection from the universal bar through the connecting rod 23, the oscillator 18, the member 41 and its arms 41ª and 41ᵇ to the stepping spacing dog 15 are the same as previously described with reference to the corresponding parts in the other form of my invention and will have the same effect in that the stepping spacing dog 15 when released will actuate said member 41 and thereby the oscillator 18 and the rod 23 and so cause initial restoration of the universal bar. In other words, my invention of means retracting the universal bar from a stepping spacing dog may be utilized without having the said means also connected as first described to a stepping holding dog.

Both forms of my escapement device are adapted for use with the so-called Remington No. 12 typewriting machine.

It will also be seen that the strength of the carriage-actuating spring with my escapement is only limited by a tolerable resistance to the retraction of the carriage while the usual high speed escapements which are non-holding-dog escapements are limited by tolerable letter spacing. The letter spacing of non-holding-dog escapements being dependent on the uniformity of finger-key manipulation and the velocity of the carriage, the alternative is a compromise between speed and accurate spacing.

What I claim as new and desire to secure by Letters Patent is:

1. In a letter spacing escapement for typewriting machines, the combination with a spring tensioned carriage and a toothed escapement member operatively connected thereto, of a movable holding dog, a stepping spacing dog arranged to stop the carriage at the end of its letter space movements, a spring placed under reactive tension by the movements of the carriage and adapted to actuate said spacing dog, and to effect initial retraction of the holding dog on the instant of the type reaching the platen.

2. In a letter spacing escapement for typewriting machines, the combination with a spring tensioned carriage and a toothed escapement member operatively connected thereto and a universal bar, of a movable holding dog, a stepping spacing dog arranged to stop the carriage at the end of its letter space movements, a spring placed under reactive tension by the movements of the carriage and adapted to actuate said spacing dog, and to effect initial retraction of the holding dog and the universal bar on the instant of the type reaching the platen.

3. In a letter spacing escapement for typewriting machines, the combination with a spring tensioned carriage and a toothed escapement member operatively connected thereto, of a movable holding dog, a stepping spacing dog arranged to stop the carriage at the end of its letter space movements, a spring placed under reactive tension by the movements of the carriage and adapted to actuate said spacing dog, and means also actuated by said last-named spring whereby initial retraction of said holding dog is effected on the instant of the type reaching the platen.

4. In a letter spacing escapement for typewriting machines, the combination with a spring tensioned carriage and a toothed escapement member operatively connected thereto, of a stepping holding dog, a stepping spacing dog arranged to stop the carriage at the end of its letter space movements, a spring placed under reactive tension by the movements of the carriage and adapted to actuate said spacing dog, and means also actuated by said last-named spring whereby initial retraction of said holding dog is effected on the instant of the type reaching the platen.

5. In a letter spacing escapement for typewriting machines, the combination with a spring tensioned carriage and a toothed escapement member operatively connected thereto, of a dog rocker, a stepping holding dog mounted on said rocker, a stepping spacing dog mounted on said rocker, a spring placed under reactive tension by the letter-space movements of the carriage and effecting initial retraction of said holding dog.

6. In a letter spacing escapement for typewriting machines, the combination with a spring tensioned carriage and a toothed escapement member operatively connected thereto, of a dog rocker, a stepping holding dog mounted on said rocker, a stepping spacing dog mounted on said rocker, a spring placed under reactive tension by the letter space movements of the carriage and effecting initial retraction of said holding dog, said spring being of sufficient strength relative to the carriage spring to form a cushion for the arrest of the carriage during the latter part of its letter space movement.

7. In a letter spacing escapement for typewriting machines, the combination with a spring tensioned carriage and a toothed escapement member operatively connected thereto, of a dog rocker, a stepping holding dog mounted on said rocker, a stepping spacing dog mounted on said rocker, a spring placed under reactive tension by the letter space movements of the carriage and actuating said spacing dog and effecting initial retraction of said holding dog.

8. In a typewriting machine the combination of a letter spacing escapement having a holding dog and a spacing dog oscillatingly mounted on a dog rocker, a spring actuating said spacing dog, power being stored in said spring by the letter space movement of the carriage and means for transmitting said power whereby the holding dog will be instantaneously retracted when the type reaches the platen.

9. In a typewriting machine, a letter spacing escapement having a toothed escapement member, a spacing dog and a holding dog, means in which power is stored by the carriage at the ending of its letter space movements, and means whereby the said power is utilized for the initial retraction of the holding dog in the direction of the feed movement of the escapement member.

10. In a typewriting machine, a letter spacing escapement having a toothed escapement member, a spacing dog, a holding dog and a dog rocker carrying said dogs, means in which power is stored by the carriage in the ending of its letter space movement and means whereby said power is utilized for the initial retraction of the dog rocker and the holding dog in the direction of the feed movement of the escapement member.

11. In a typewriting machine the combination of a letter spacing escapement having a toothed escapement member, a cushion arrested for the carriage to operate at the ending of its letter space movements and means whereby the force of said cushion will effect retraction of the holding dog in the direction of the feeding movement of the toothed escapement member instantaneously with the type reaching the platen.

12. In a typewriting machine the combination of a letter spacing escapement having a spacing dog and holding dog, said dogs being vibratingly mounted on a dog rocker, the carriage being arrested by a cushion at the ending of its letter space movements and means whereby the re-action of said cushion will effect initial retraction of the holding dog instantaneously with the type reaching the platen.

13. In a typewriting machine the combination of a letter spacing escapement having a spacing dog and a holding dog mounted on a vibrating support, said dogs being arranged to vibrate independent of and together with said support, the spacing dog being cushioned for arresting the carriage at the ending of its letter space movements, and means whereby the re-action of said cushion will effect initial retraction of the holding dog on the instant of the type reaching the platen.

In witness whereof I have affixed my signature, this 20 day of September 1920.

LOUIS P. DISS.